(12) United States Patent
Hwang et al.

(10) Patent No.: US 8,437,241 B2
(45) Date of Patent: May 7, 2013

(54) METHOD OF AND APPARATUS FOR RECORDING DATA ON WRITE-ONCE DISC THAT HAS A TEMPORARY DISC MANAGEMENT AREA INCLUDING A SPACE BIT MAP REPRESENTING A DATA RECORDING STATUS OF THE DISC, AND WRITE-ONCE DISC THEREFOR

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/108,952

(22) Filed: May 16, 2011

(65) Prior Publication Data
US 2011/0216636 A1 Sep. 8, 2011

Related U.S. Application Data

(63) Continuation of application No. 11/052,165, filed on Feb. 8, 2005, now Pat. No. 7,944,805.

(30) Foreign Application Priority Data

Feb. 14, 2004 (KR) .................. 10-2004-0009836
Dec. 15, 2004 (KR) .................. 10-2004-0106538

(51) Int. Cl.
*G11B 20/10* (2006.01)

(52) U.S. Cl.
USPC ............... 369/275.3; 369/47.14; 369/47.22; 369/53.15; 369/53.17; 711/4; 711/111; 711/154

(58) Field of Classification Search ............... 365/275.3, 365/47.14, 47.22, 53.15, 53.17; 711/4, 111, 711/154
See application file for complete search history.

(56) References Cited

U.S. PATENT DOCUMENTS

| 6,367,049 B1 | 4/2002 | Van Dijk et al. |
| 7,051,054 B1 | 5/2006 | Lee et al. |

(Continued)

FOREIGN PATENT DOCUMENTS

| EP | 0 350 920 A2 | 1/1990 |
| EP | 1 607 969 A1 | 12/2005 |

(Continued)

OTHER PUBLICATIONS

International Search Report and Written Opinion of the International Searching Authority issued on Jun. 22, 2005, in counterpart International Application No. PCT/KR2005/000377 (6 pages, in English).

(Continued)

*Primary Examiner* — Hong Kim
(74) *Attorney, Agent, or Firm* — NSIP Law

(57) ABSTRACT

A method of recording, and an apparatus for recording, data on a write-once disc, and the write-once disc used with the method and the apparatus. The write-once disc includes a plurality of update areas in which to record a predetermined type of updated information, at least one main access information area (AIA) in which to record main access information (AI), the main AI indicating a final update area in which finally updated information is recorded, among the plurality of update areas, and at least one sub AIA in which to record sub AI, the sub AI indicating a location of the finally updated information recorded in the final update area.

6 Claims, 12 Drawing Sheets

U.S. PATENT DOCUMENTS

| | | |
|---|---|---|
| 7,233,550 B2 | 6/2007 | Park et al. |
| 7,266,061 B2 | 9/2007 | Yoshida et al. |
| 7,296,178 B2 | 11/2007 | Yoshida et al. |
| 7,554,891 B2 * | 6/2009 | Park et al. ............ 369/53.17 |
| 7,774,534 B2 | 8/2010 | Hwang et al. |
| 7,944,805 B2 * | 5/2011 | Hwang et al. ............ 369/275.3 |
| 2004/0090888 A1 | 5/2004 | Park et al. |
| 2004/0145980 A1 | 7/2004 | Park et al. |
| 2004/0174793 A1 * | 9/2004 | Park et al. ............ 369/59.25 |
| 2004/0179458 A1 * | 9/2004 | Hwang et al. ............ 369/275.3 |
| 2004/0185216 A1 | 9/2004 | Hwang et al. |
| 2004/0193946 A1 | 9/2004 | Park et al. |
| 2005/0083815 A1 | 4/2005 | Park |
| 2005/0111315 A1 * | 5/2005 | Hwang et al. ............ 369/47.14 |

FOREIGN PATENT DOCUMENTS

| | | |
|---|---|---|
| JP | 2007-501488 A | 1/2007 |
| JP | 2008-181647 A | 8/2008 |
| WO | WO 2004/077420 A1 | 9/2004 |
| WO | WO 2004/084217 A1 | 9/2004 |
| WO | WO 2005/013266 A1 | 2/2005 |
| WO | WO 2005/015558 A1 | 2/2005 |

OTHER PUBLICATIONS

Japanese Office Action issued on Jan. 19, 2010, in counterpart Japanese Application No. 2006-553052 (5 pages, in Japanese, no English translation).

U.S. Appl. No. 11/052,165, filed Feb. 8, 2005, Sung-hee Hwang et al., Samsung Electronics Co., Ltd.

European Search Report issued Nov. 29, 2012 in counterpart European Patent Application No. 05726441.8 (4 pages, in English).

* cited by examiner

METHOD OF AND APPARATUS FOR RECORDING DATA ON WRITE-ONCE DISC THAT HAS A TEMPORARY DISC MANAGEMENT AREA INCLUDING A SPACE BIT MAP REPRESENTING A DATA RECORDING STATUS OF THE DISC, AND WRITE-ONCE DISC THEREFOR

CROSS-REFERENCE TO RELATED APPLICATIONS

This application is a continuation of application Ser. No. 11/052,165 filed on Feb. 8, 2005, now U.S. Pat. No. 7,944,805 issued on May 17, 2011, which claims the benefit of Korean Patent Application Nos. 2004-9836 filed on Feb. 14, 2004, and 2004-106538 filed on Dec. 15, 2004, in the Korean Intellectual Property Office, the disclosures of which are incorporated herein by reference.

BACKGROUND OF THE INVENTION

1. Field of the Invention

The present invention relates to a write-once disc, and, more particularly, to a method of recording, and an apparatus for recording, data on a write-once disc so as to access more quickly information required to use the write-once disc, and a write-once disc used with the method and the apparatus.

2. Description of the Related Art

New information can be repeatedly recorded on a rewritable disc on which information has already been recorded. However, when new information is recorded on a write-once disc, since information that has already been recorded can be neither erased nor repeatedly recorded at a location where the information was already recorded, a new location must be allocated in order to update the information already recorded.

Generally, only information which has been finally updated is meaningful. Therefore, to read the information which has been finally updated, an update area is allocated to a data area, and a data recording and/or reproducing apparatus detects the information which has been finally updated by searching for the update area in which updated information is recorded. When a large amount of information is recorded in the update area, it takes an excessive amount of time to detect desired information.

On a write-once disc for which defect management by a data recording and/or reproducing apparatus is performed, areas exist in which to record information for managing defects generated while the write-once disc is being used, and information indicating a recording status of the write-once disc. Unlike a rewritable disc, according to a characteristic of the write-once disc, since updated information cannot be repeatedly recorded at a location where existing information has been recorded when an update of the defect management information is required, the updated information must be recorded at an empty location. Accordingly, a relatively large update area is necessary. In general, the update area is allocated to a lead-in area or a lead-out area. However, sometimes, the update area may be allocated to a data area in order to increase an update count according to a user's designation.

When finally updated information required to use the write-once disc is recorded in the update area allocated to the data area, and when information indicating that the update area is allocated to the data area and information indicating a location of the update area are included in the finally updated information, the finally updated information or a location in which the finally updated information is recorded cannot be detected, even if the entire update area allocated to the lead-in area or the lead-out area is searched.

Even if a data recording and/or reproducing apparatus detects that the finally updated information is recorded in the update area allocated to the data area, if the size of the update area is large, it may take an excessive amount of time to search the finally updated information recorded in the update area.

SUMMARY OF THE INVENTION

The present invention provides a write-once disc having access information error-correction-coded in a predetermined method and repeatedly recorded thereon, the access information allowing an access time to read updated information required to use the write-once disc to be reduced.

The present invention also provides a data recording apparatus and method by which an access time to read updated information required to use a write-once disc can be reduced.

Additional aspects and/or advantages of the invention will be set forth in part in the description which follows and, in part, will be obvious from the description, or may be learned by practice of the invention.

According to an aspect of the present invention, there is provided a write-once disc including a plurality of update areas in which to record a predetermined type of updated information; at least one main access information area (AIA) in which to record main access information (AI), the main access information indicating a final update area in which finally updated information is recorded, among the plurality of update areas; and at least one sub AIA in which to record sub AI, the sub AI indicating a location of the finally updated information recorded in the final update area; wherein the main AI is repeatedly recorded in an entire recording block in the at least one main AIA.

According to another aspect of the present invention, there is provided a write-once disc including a plurality of update areas in which to record a predetermined type of updated information; and at least one AIA in which to record AI, the AI indicating a final update area, in which finally updated information is recorded, among the plurality of update areas; wherein the AI includes location information of the plurality of update areas, first flag information indicating the final update area, and second flag information indicating a location of the finally updated information recorded in the final update area.

According to another aspect of the present invention, there is provided a write-once disc including a plurality of update areas, which are used in a predetermined order, and in which to record a predetermined type of updated information; and at least one AIA in which to record AI including location information of the plurality of update areas, in recording block units; wherein a final update area, in which to record finally updated information, among the plurality of update areas is indicated according to a number of recording blocks in which the AI is recorded; and the AI is repeatedly recorded in an entire recording block of the AIA.

According to another aspect of the present invention, there is provided a data recording apparatus including a write/read unit to write or read information on or from a write-once disc; and a controller to control the write/read unit to record a predetermined type of finally updated information in one of a plurality of update areas allocated to the write-once disc, record main AI in at least one main AIA allocated to the write-once disc to indicate a final update area in which the finally updated information is recorded, and record sub AI in at least one sub AIA allocated to the write-once disc to indicate a location of the finally updated information recorded in the final update area, wherein the controller controls the write/read unit to repeatedly write the main AI in an entire recording block in the main AIA.

According to another aspect of the present invention, there is provided a data recording apparatus including a write/read unit to write or read information on or from a write-once disc; and a controller controlling the write/read unit to record a predetermined type of finally updated information in one of a plurality of update areas allocated to the write-once disc, and record AI indicating a final update area, in which the finally updated information is recorded, in at least one AIA allocated to the write-once disc, wherein the AI includes location information of the plurality of update areas, first flag information indicating the final update area, and second flag information indicating a location of the finally updated information recorded in the final update area, and the controller controls the write/read unit to repeatedly write the AI in an entire recording block in the AIA.

According to another aspect of the present invention, there is provided an apparatus to record data on a write-once disc having a plurality of update areas used in a predetermined order and at least one AIA, the apparatus including a write/read unit to write or read information on or from the write-once disc; and a controller controlling the write/read unit to record a predetermined type of finally updated information in one of the plurality of update areas, and record AI including location information of the plurality of update areas in the AIA in recording block units and indicating a final update area, in which the finally updated information is recorded, among the plurality of update areas using a number of recording blocks in which the AI is recorded, wherein the controller controls the write/read unit to repeatedly write the AI in an entire recording block in the AIA.

According to another aspect of the present invention, there is provided a method of recording data on a write-once disc, the method including recording a predetermined type of finally updated information in one of a plurality of update areas allocated to the write-once disc; recording main AI in at least one main AIA allocated to the write-once disc to indicate a final update area in which the finally updated information is recorded; and recording sub in at least one sub AIA allocated to the write-once disc to indicate a location of the finally updated information recorded in the final update area; wherein the main AI is repeatedly recorded in an entire recording block in the at least one main AIA.

According to another aspect of the present invention, there is provided a method of recording data on a write-once disc, the method including recording a predetermined type of finally updated information in one of a plurality of update areas allocated to the write-once disc; and recording AI indicating a final update area, in which the finally updated information is recorded, in at least one AIA allocated to the write-once disc; wherein the AI includes location information of the plurality of update areas, first flag information indicating the final update area, and second flag information indicating a location of the finally updated information recorded in the final update area, and the AI is repeatedly recorded in an entire recording block in the AIA.

According to another aspect of the present invention, there is provided a method of recording data on a write-once disc having a plurality of update areas used in a predetermined order and at least one AIA, the method including recording a predetermined type of updated information in one of the plurality of update areas; and indicating a final update area in which finally updated information is recorded among the plurality of update areas according to a number of recording blocks in which AI is recorded by recording the AI, including location information of the plurality of update areas, in the AIA in recording block units; wherein the AI is repeatedly recorded in an entire recording block in the AIA.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
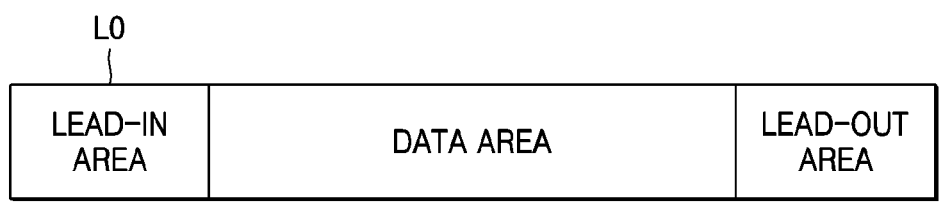
FIGS. 1A and 1B are structures of a write-once disc according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1B:
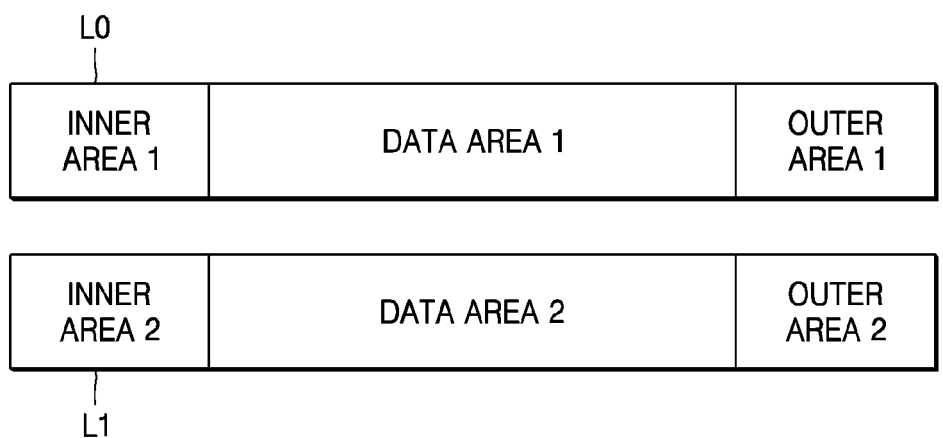

FIGS. 1A and 1B are structures of a write-once disc according to an embodiment of the present invention. FIG. 1A is a structure of a write-once disc having a single recording layer, and FIG. 1B is a structure of a write-once disc having a double recording layer.

The write-once disc having a single recording layer in FIG. 1A includes a lead-in area, a data area, and a lead-out area arranged from the inner circumference to the outer circumference.

Each of a first recording layer L0 and a second recording layer L1 of the write-once disc having a double recording layer in FIG. 1B includes a lead-in area, a data area, and a lead-out area arranged from the inner circumference to the outer circumference.

Figure 2:
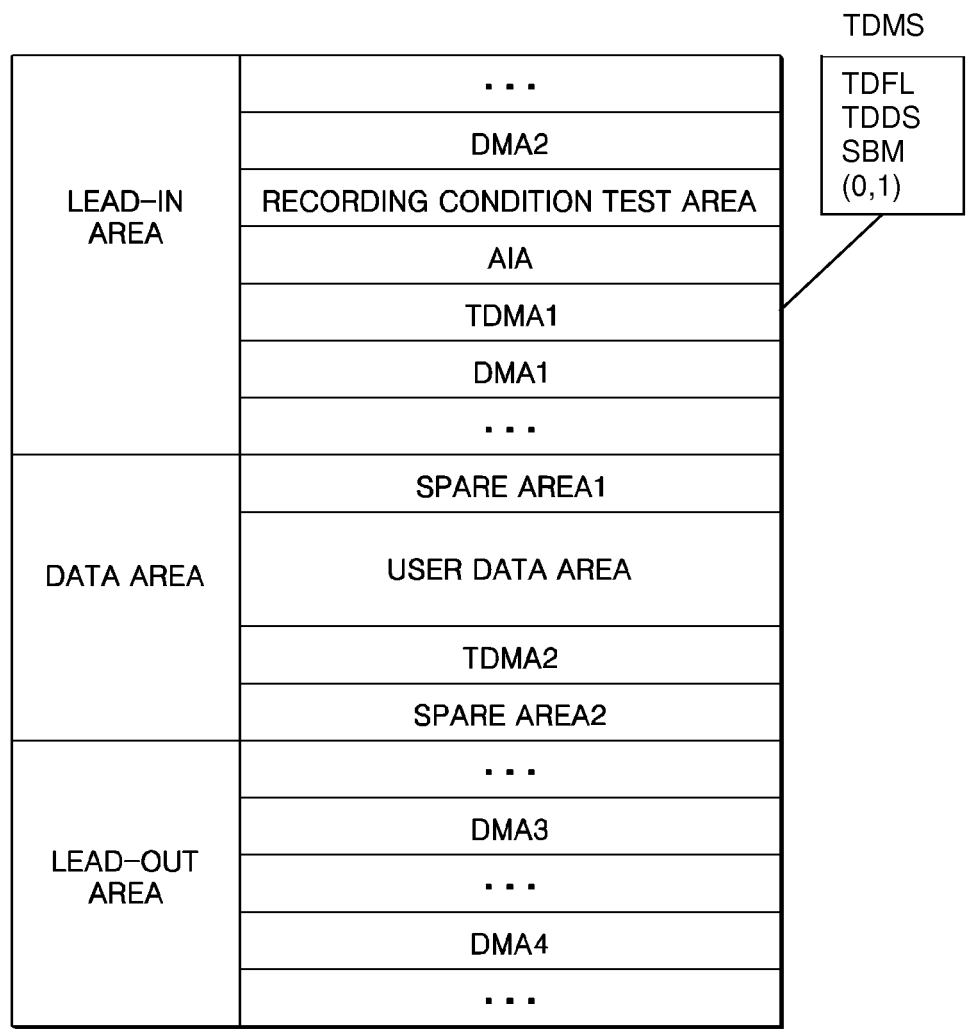
FIG. 2 is a detailed structure of a write-once disc having a single recording layer according to an embodiment of the present invention.

FIG. 2 is a detailed structure of the write-once disc having a single recording layer according to an embodiment of the present invention. Referring to FIG. 2, the lead-in area includes a first disc management area (DMA1), a second disc management area (DMA2), a first temporary disc management area (TDMA1), an access information area (AIA), and a recording condition test area. The lead-out area includes a third disc management area (DMA3) and a fourth disc management area (DMA4). Also, the lead-out area may further include at least one of a temporary defect management area, a recording condition test area, and an AIA. That is, there may be at least one of each of the AIA, the DMA, the TDMA, and the recording condition test area in at least one of the lead-in area and the lead-out area.

The AIA is an area in which to record access information indicating a location at which update information, such as defect management information that a recording and/or reproducing apparatus should obtain to use a write-once disc, is recorded. The access information and the AIA will be described later.

The data area includes a first spare area, a user data area, a second temporary disc management area (TDMA2), and a second spare area.

The TDMA1 included in the lead-in area is assigned during manufacturing, based on the specification of the write-once disc according to the present embodiment. However, the first spare area, the TDMA2, and the second spare area included in the data area are allocated to the data area by a user's selection in a process of initializing the write-once disc.

Figure 3A:
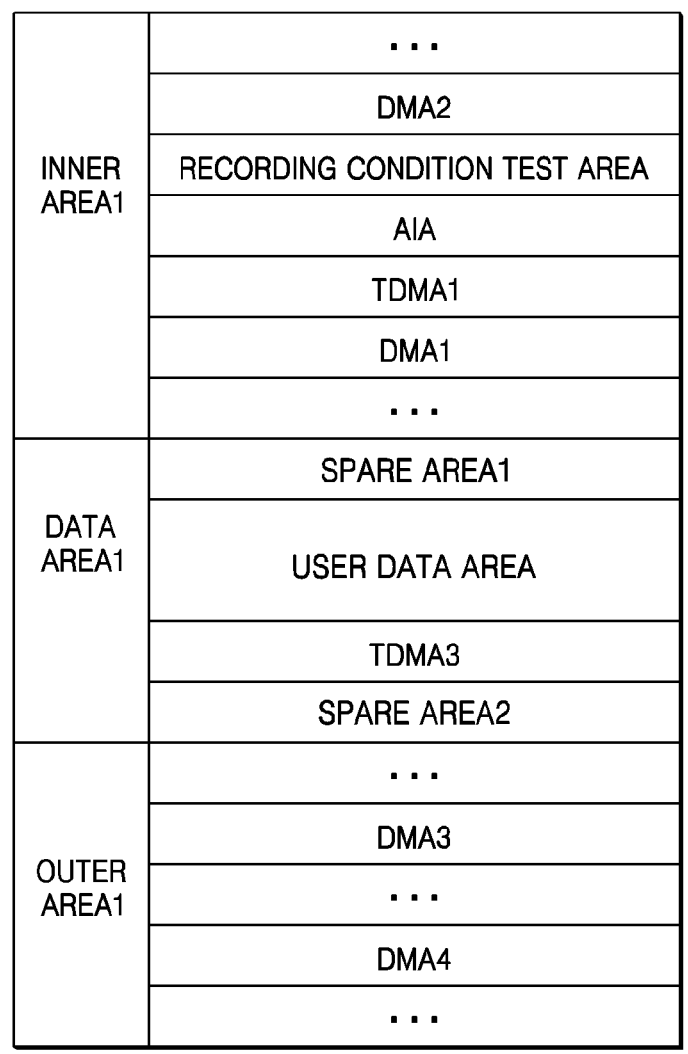
FIGS. 3A and 3B are detailed structures of a write-once disc having a double recording layer according to an embodiment of the present invention.
Figure 3B:
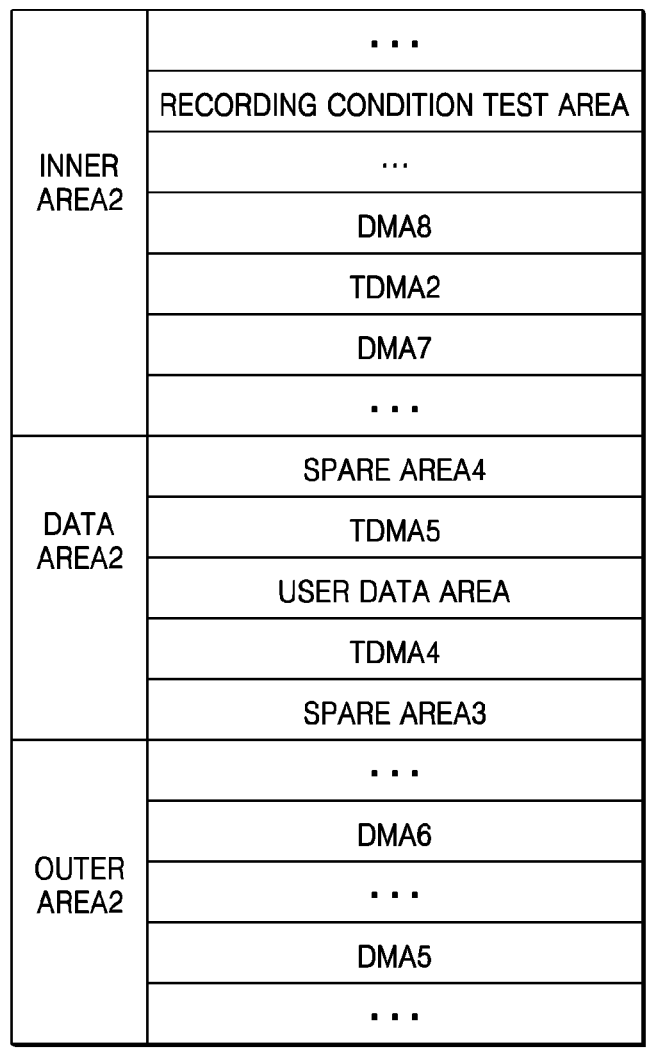

FIGS. 3A and 3B are detailed structures of a write-once disc having a double recording layer according to an embodiment of the present invention. FIG. 3A is a structure of a first recording layer L0, and FIG. 3B is a structure of a second recording layer L1. The structure of the first recording layer L0 shown in FIG. 3A is identical to the structure of the write-once disc having a single recording layer shown in FIG. 2. The structure of the second recording layer L1 shown in FIG. 3B is similar to the structure of the first recording layer L0. However, in the structure of the second recording layer L1, the AIA is not allocated to a second inner area, and two TDMAs are allocated to a second data area.

The write-once disc having a double recording layer includes five TDMAs, a TDMA1 through a TDMA5. Locations and sizes of the TDMA1 and TDMA2 are well known to recording apparatuses and/or reproducing apparatuses. However, a TDMA3, a TDMA4, and the TDMA5 are allocated to data areas by a user or a recording and/or reproducing apparatus when a disc initialization is performed to use the write-once disc having a double recording layer.

Figure 4A:
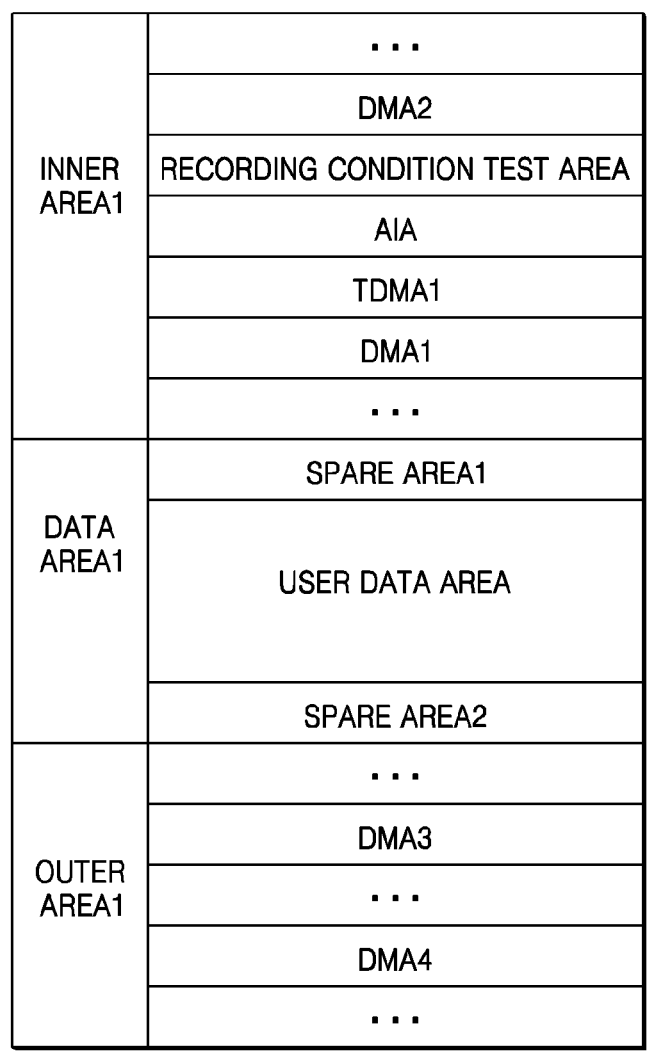
FIGS. 4A and 4B are detailed structures of a write-once disc having a double recording layer according to another embodiment of the present invention.
Figure 4B:
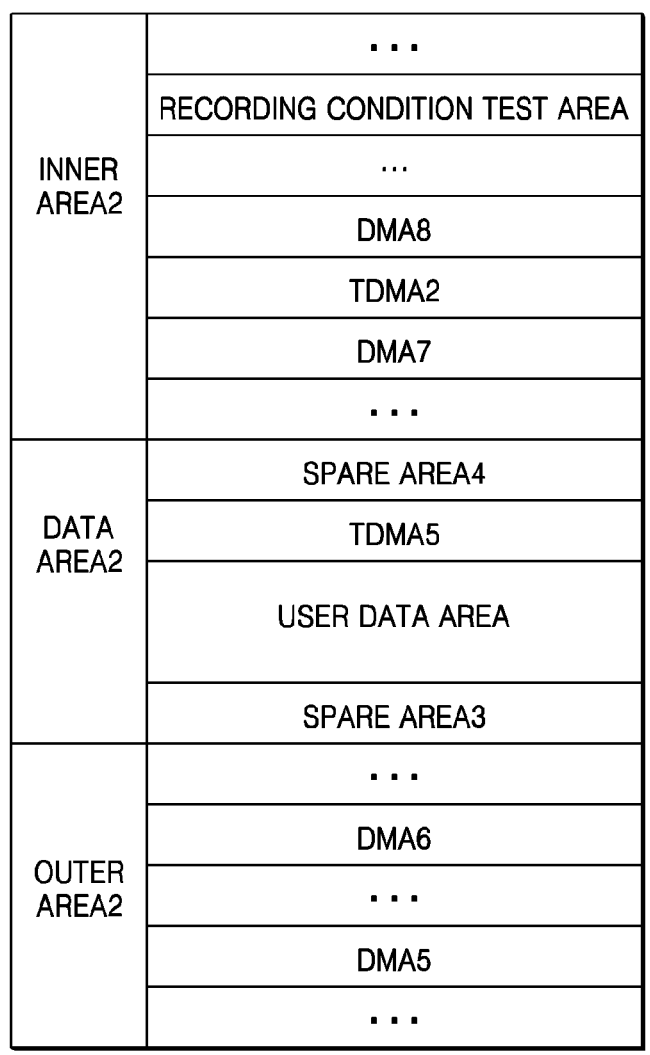

FIGS. 4A and 4B are detailed structures of a write-once disc having a double recording layer according to another embodiment of the present invention. FIG. 4A is a structure of a first recording layer L0, and FIG. 4B is a structure of a second recording layer L1. A TDMA1, a TDMA2, and a TDMA5 are allocated to the write-once disc having a double recording layer shown in FIGS. 4A and 4B. That is, besides the well known TDMA1 and TDMA2, only the TDMA5 is allocated to a second data area by a user or a recording and/or reproducing apparatus when a disc initialization is performed to use the write-once disc having a double recording layer.

Areas such as TDMAs allocated to a write-once disc, and a process of recording data in the areas, will now be described.

A TDMA is an area in which to record a temporary disc management structure (TDMS) for management of the write-once disc before a finalization of the write-once disc. The finalization of the write-once disc is an operation preventing the write-once disc from being recorded again. When data cannot be recorded on the write-once disc any more by a selection of a user, or when data cannot additionally be recorded on the write-once disc, the write-once disc is finalized.

The TDMS includes a temporary disc defect list (TDFL), a temporary disc definition structure (TDDS), and a space bit map (SBM), a shown in the example of FIG. 2 in which an example of a TDMS for TDMA1 is illustrated. The TDFL includes information indicating an area in which a defect is generated and information indicating a substitute area. The TDDS, which is used to manage the TDFL, includes a location pointer indicating a location in which the TDFL is recorded, a location pointer indicating a location in which the SBM is recorded, information indicating locations and sizes of spare areas allocated to data areas, and information indicating locations and sizes of TDMAs allocated to the data areas. The SBM shows a data recording status of the write-once disc with a bit map by allocating different bit values to clusters in which data is recorded in cluster units, which are data recording units, and clusters in which data is not recorded.

When the write-once disc is loaded into the recording and/or reproducing apparatus, a finally updated TDMS, in particular, a finally updated TDDS, must be quickly read and reproduced from the write-once disc in order to use the write-once disc in the apparatus.

Commonly, when the write-once disc is loaded into the recording apparatus and/or the reproducing apparatus, the recording apparatus and/or the reproducing apparatus determines how to manage the write-once disc and how to record or reproduce data by reading information from the lead-in area and/or the lead-out area. If an amount of information recorded in the lead-in area and/or the lead-out area is large, more time is taken to prepare recording or reproducing after the write-once disc is loaded. Therefore, a concept of the TDMS is used, and the TDMS generated while data is recorded on or reproduced from the write-once disc is recorded in the TDMA, which is separated from a defect management area, and allocated to the lead-in area and/or the lead-out area.

When the write-once disc is finalized, the TDMS, i.e., the TDFL and the TDDS, recorded in the TDMA is finally recorded in a DMA since an information access to quickly use the write-once disc is possible by allowing the recording and/or reproducing apparatus to read only meaningful information from the defect management area by storing only finally meaningful information among TDFLs and TDDSs, which are updated and recorded several times, in the DMA.

Figure 5A:
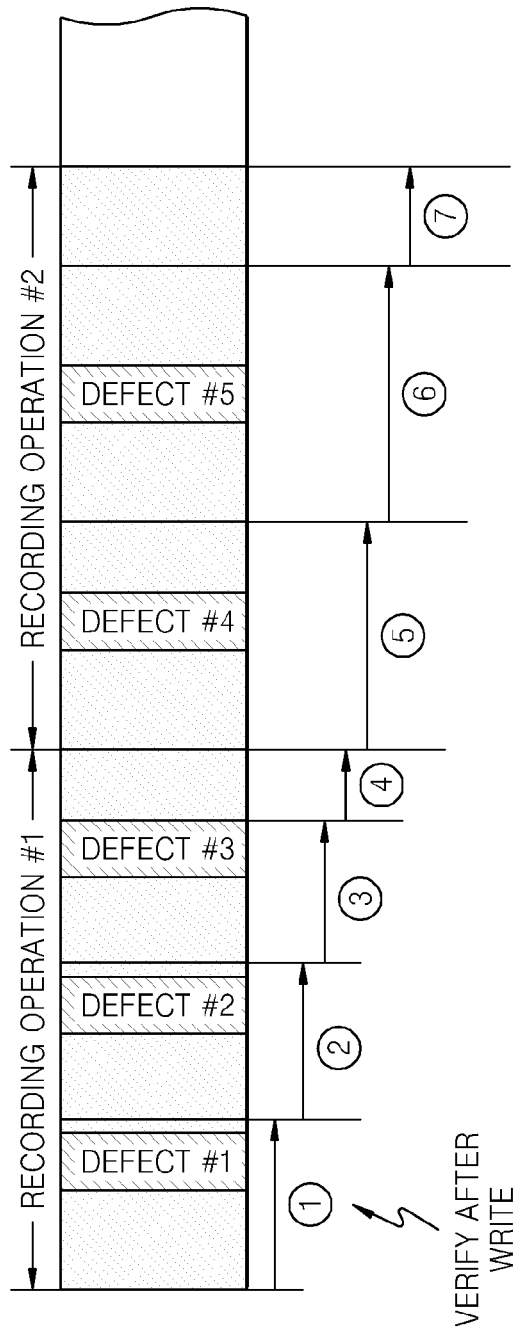
FIGS. 5A and 5B illustrate a process of recording data in a user data area and a spare area according to an embodiment of the present invention.
Figure 5B:
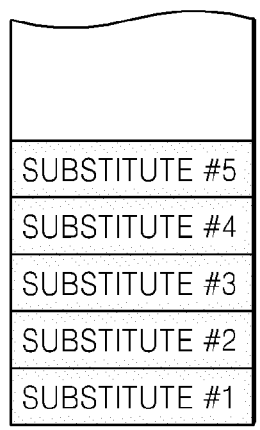

FIGS. 5A and 5B illustrate a process of recording data in a user data area and a spare area according to an embodiment of the present invention.

FIG. 5A denotes the user data area, and FIG. 5B denotes the spare area. A method of recording user data in the user data area includes a continuous recording mode and a random recording mode. The user data is recorded continuously and sequentially in the continuous recording mode and randomly in the random recording mode. Zones ① through ⑦ indicate units in which verification after recording is performed.

A recording apparatus writes the user data in the zone ① and verifies whether the user data has been normally written or a defect has been generated in the zone ①. If a portion in which a defect has been generated is found, the portion is designated as a defect area, i.e., defect #1. Also, the recording apparatus rewrites the user data, which has been written in the defect #1, in the spare area. The user data that has been written in the defect #1 is rewritten in a portion of the spare area called a substitute #1. The recording apparatus writes the user data in the zone ② and verifies whether the user data has been normally written or a defect has been generated in the zone ②. If a portion in which a defect is generated is found, the portion is designated as a defect area, i.e., defect #2. Likewise, a substitute #2, corresponding to the defect #2, is generated. Also, in the zone ③, a defect #3 and a substitute #3 are generated. In the zone ④, a defect area does not exist, since a portion in which a defect has been generated is not found.

If an end of a recording operation #1 is predicted after the user data is written and verified, that is, if a user pushes an eject button, or if recording of the user data allocated to a recording operation is finished, the recording apparatus writes information related to the defect #1, the defect #2, and the defect #3, which are defect areas generated in the zones ① through ④, in the TDMA as a TDFL #1. Also, a management structure to manage the TDFL #1 is written in the TDMA as a TDDS #1. The recording operation is a work unit determined by an intention of the user or a desired recording work. In the present embodiment, the recording operation indicates a period from when the write-once disc is loaded, and a recording work of predetermined information is performed, to when the write-once disc is unloaded from the recording apparatus.

When the write-once disc is loaded again, a recording operation #2 starts, a recording condition in the recording condition test area is tested, and the user data is written on the basis of the test result. That is, in the recording operation #2, the user data is written in zones ⑤ through ⑦ in the same manner of the recording operation #1, and a defect #4, a defect #5, a substitute #4, and a substitute #5 are generated. When the recording operation #2 ends, the recording apparatus writes information related to the defect #4 and the defect #5 in the TDMA as a TDFL #2. Also, a management structure to manage the TDFL #2 is written in the TDMA as a TDDS #2.

As shown in FIGS. 2, 3A, 3B, 4A, and 4B, when a plurality of TDMAs and spare areas are allocated to the write-once disc, the TDMAs and spare areas are used in a predetermined order. For example, when a data write path used in the write-once disc having a double recording layer, as shown in FIGS. 3A and 3B, is an opposite track path, i.e., a path where data is recorded from a first inner area of the first recording layer L0 to a first outer area of the first recording layer L0, and from a second outer area of the second recording layer L1 to a second inner area of the second recording layer L1, data in the spare areas is recorded starting from a first spare area of the first recording layer L0. When the first spare area is full, a second spare area, a third spare area, and a fourth spare area are used in this order.

Likewise, the TDMS is recorded starting from the TDMA1 of the first recording layer L0. When the TDMA1 is full, an updated TDMS is recorded in the TDMA2 allocated to the second inner area of the second recording layer L1. When the TDMA2 is full, a newly updated TDMS is recorded in the TDMA3 allocated to a first data area of the first recording layer L0. In the present embodiment, the TDMA1 and the TDMA2 allocated to the inner areas of the recording layers are essential to the write-once disc. However, the TDMA(s) allocated to the data areas may be or may not be allocated by a selection of the user. Therefore, the TDMS is recorded in a sequential manner starting with the TDMAs allocated to the inner areas of the recording layers. When the TDMAs allocated to the inner areas of the recording layers are full, the TDMAs allocated to the data areas are used.

When a finally updated TDMS is written in a TDMA allocated to a data area, the write-once disc is unloaded, and the write-once disc is reloaded into a recording and/or reproducing apparatus, the recording and/or reproducing apparatus must obtain the finally updated TDMS to use the write-once disc. However, the TDMS is recorded in the TDMA allocated to the data area, and the recording and/or reproducing apparatus cannot recognize the fact that the TDMS is recorded in the TDMA allocated to the data area until the disc drive accesses the TDDS included in the TDMS. Also, even if the recording and/or reproducing apparatus recognizes the fact that the finally updated TDMS is recorded in the TDMA allocated to the data area, if the size of the TDMA is large, it may take an excessive amount of time to search the finally updated TDMS recorded in the TDMA.

To solve this problem, three embodiments will now be suggested in the present invention. In these three embodiments, access information (AI) indicates a location where update information such as the TDMS, in particular, the TDDS, is recorded. Also, the update information indicates information that a recording and/or reproducing apparatus should recognize to use a write-once disc in an initial period when the write-once disc is loaded into the recording and/or reproducing apparatus. Also, an area in which the update information is recorded is called an update area. In these three embodiments, the update information is the TDDS, and the update area is the TDMA.

I. The First Embodiment

In the present embodiment, at least one main AIA used to record main AI is allocated to a lead-in area or an inner area of a write-once disc, and a sub AIA is allocated to a TDMA.

When the write-once disc is loaded, a recording and/or reproducing apparatus first obtains the main AI by accessing the main AIA. The recording and/or reproducing apparatus recognizes a TDMA in which a finally updated TDDS is recorded from the main AI, and then obtains a sub AI by accessing a sub AIA of the TDMA. Since the recording and/or reproducing apparatus can recognize a location where the finally updated TDDS is recorded in the TDMA from the sub AI, time required to search for the finally updated TDDS in the TDMA can be reduced.

The AIA allocated to the write-once disc shown in FIGS. 2, 3A, and 4A is the main AIA according to the present embodiment. The size of the main AIA is preferably, though not necessarily, limited by minimizing an amount of main AI recorded in the main AIA and a main AI update count since it takes longer to obtain the main AI if the size of the main AIA is larger, or a plurality of main AIAs are allocated. In order to minimize the main AI update count, when the TDMA in which a final TDDS is recorded is changed, the main AI is recorded in one recording unit block of the main AIA.

Figure 6:
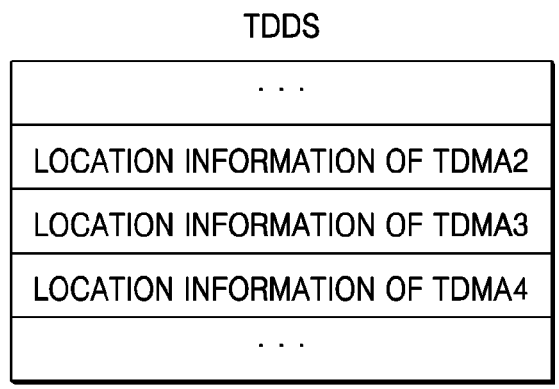
FIG. 6 is a data structure of temporary disc management information according to an embodiment of the present invention.

FIG. 6 is a data structure of a TDDS according to the first embodiment of the present invention. In the present embodiment, a data structure of a separate main AI is not defined, and the TDDS is used as the main AI. As described above, the TDDS includes location information of TDMAs allocated to a write-once disc. As shown in FIGS. 3A and 3B, when the TDMA1 through TDMA5 are allocated to the write-once disc, the TDDS includes location information of the TDMA1 through TDMA5.

In the present embodiment, a recording and/or reproducing apparatus can recognize a TDMA in which a final TDDS is recorded from the number of recording unit blocks in which TDDSs are recorded in a main AIA. A case in which TDMA1 through TDMA5 are allocated to a write-once disc, and used in an order of TDMA1, TDMA2, TDMA3, TDMA4, and TDMA5, will now be described in detail. If the main AI, i.e. the TDDS, is not recorded in the main AIA at all, the recording and/or reproducing apparatus recognizes that the final TDDS is recorded in a first TDMA, i.e., the TDMA1.

If a TDDS is recorded only in a first block of the main AIA, the recording and/or reproducing apparatus recognizes that the final TDDS is recorded in a second TDMA, i.e., the TDMA2. If TDDSs are recorded in first and second blocks of the main AIA, the recording and/or reproducing apparatus recognizes that the final TDDS is recorded in a third TDMA, i.e., the TDMA3. Likewise, if TDDSs are recorded in first through third blocks of the main AIA, the recording and/or reproducing apparatus recognizes that the final TDDS is recorded in a fourth TDMA, i.e., the TDMA4. And if TDDSs are recorded in first through fourth blocks of the main AIA, the recording and/or reproducing apparatus recognizes that the final TDDS is recorded in a fifth TDMA, i.e., the TDMA5.

As described above, the recording and/or reproducing apparatus recognizes a TDMA in which a final TDDS is recorded from the number of recording unit blocks in which TDDSs are recorded in the main AIA, and reproduces the TDDS finally recorded in the main AIA. Accordingly, the recording and/or reproducing apparatus can recognize location information of the TDMA from the TDDS.

According to the present embodiment, the size of the main AIA depends on the number of TDMAs allocated to a write-once disc. That is, if N TDMAs exist in the write-once disc, the main AIA includes at least (N−1) recording unit blocks.

It is preferable, though not necessary, that a TDDS recorded as the main AI in the main AIA is repeatedly recorded in one recording block. If the size of the TDDS is equal to the size of one sector, 2K bytes, and if the size of the recording unit block is 64K bytes, one TDDS can be repeatedly recorded 32 times in one recording block. An error correction format that enables error correction in sector units is disclosed in U.S. Pat. No. 6,367,049. If one TDDS is repeatedly recorded 32 times in one recording unit block of a 64 Kbyte size according to the error correction format disclosed in U.S. Pat. No. 6,367,049, a possibility of successfully reproducing the TDDS can be highly increased. That is, even if errors due to scratches are generated on the recording unit block in which the TDDS, the AI, is repeatedly recorded 32 times, if error correction of at least one TDDS among the 32 repeated TDDSs is possible, the recording and/or reproducing apparatus can obtain the AI.

The sub AIA and the sub AI will now be described. The sub AIA is allocated starting from a first block of each TDMA, and the size of the sub AIA depends on how many sub areas a TDMA, including the sub AIA, is divided into.

Figure 7:
FIG. 7 is a data structure of a temporary disc management area (TDMA) divided into a sub access information area (AIA) and a plurality of sub areas.

FIG. 7 is a data structure of a TDMA divided into a sub AIA and a plurality of sub areas. Like the main AIA, a TDDS is used as a sub AI, and a recording and/or reproducing apparatus recognizes a sub area in which a final TDDS is recorded in the TDMA from the number of recording unit blocks in which TDDSs are recorded in the sub AIA.

As in the case in which the main AI is recorded in the main AIA, the TDDS recorded as the sub AI may be repeatedly recorded in one recording unit block.

As shown in FIG. 7, the TDMA is divided into first through M-th sub TDMAs, and when the sub areas are sequentially used in a direction from the first sub TDMA to the M-th sub TDMA, if a TDDS is not recorded in the sub AIA at all, the recording and/or reproducing apparatus recognizes that a final TDDS is recorded in the first sub TDMA, i.e., Sub TDMA 1.

If a TDDS is recorded only in a first block of the sub AIA, the recording and/or reproducing apparatus recognizes that the final TDDS is recorded in a second sub TDMA, i.e., Sub TDMA 2. If TDDSs are recorded in first and second blocks of the sub AIA, the recording and/or reproducing apparatus recognizes that the final TDDS is recorded in a third sub TDMA, i.e., Sub TDMA 3. According to the present embodiment, the size of the sub AIA allocated to each TDMA depends on the number of sub areas allocated to each TDMA. That is, if M sub areas exist in a TDMA, the sub AIA should include at least (M−1) recording unit blocks.

Figure 8:
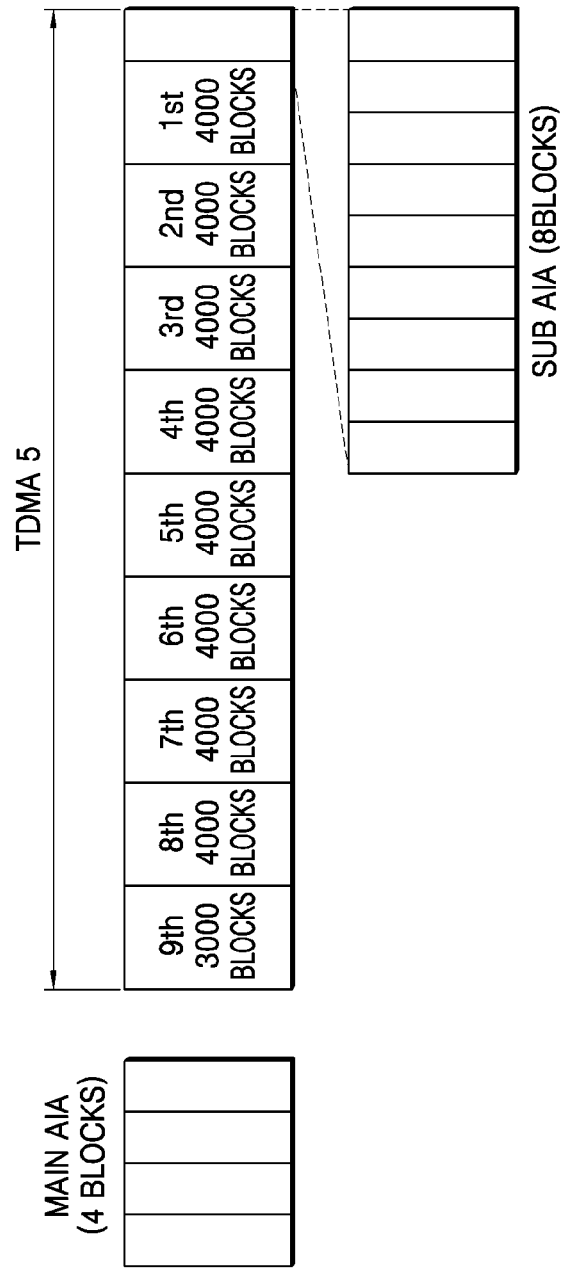
FIG. 8 illustrates a main AIA and a sub AIA according to an embodiment of the present invention.

FIG. 8 illustrates a main AIA and a sub AIA according to an embodiment of the present invention. A write-once disc according to the present embodiment is a disc in which only a TDMA5 is allocated to a data area when initialization to use the disc is performed as shown in FIGS. 4A and 4B. The main AIA includes 4 recording unit blocks. In the present embodiment, the TDMA5 includes 35,000 blocks and is divided into units of 4,000 blocks (except for one unit that contains only 3,000 blocks). That is, the TDMA5 includes 9 sub areas. Therefore, as described above, the sub AIA includes 8 recording unit blocks.

When the write-once disc is initialized, or when a TDMA1 is used, main AI is not recorded in the main AIA. If a location where a final TDDS is recorded is changed to a TDMA2, a recording and/or reproducing apparatus indicates that the final TDDS is recorded in the TDMA2 by recording a TDDS in a first block of the main AIA.

If a location where the final TDDS is recorded is changed to the TDMA5, the recording and/or reproducing apparatus indicates that the final TDDS is recorded in a first sub area of the TDMA5 by recording TDDSs in second, third, and fourth blocks of the main AIA.

Figure 9A:
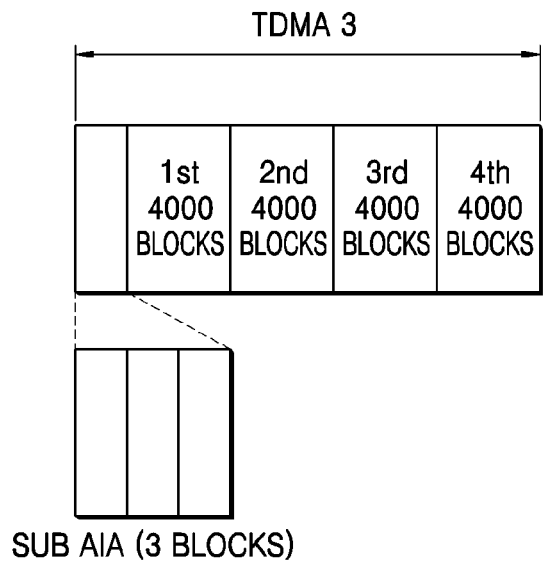
FIGS. 9A and 9B illustrate sub AIAs according to another embodiment of the present invention.
Figure 9B:
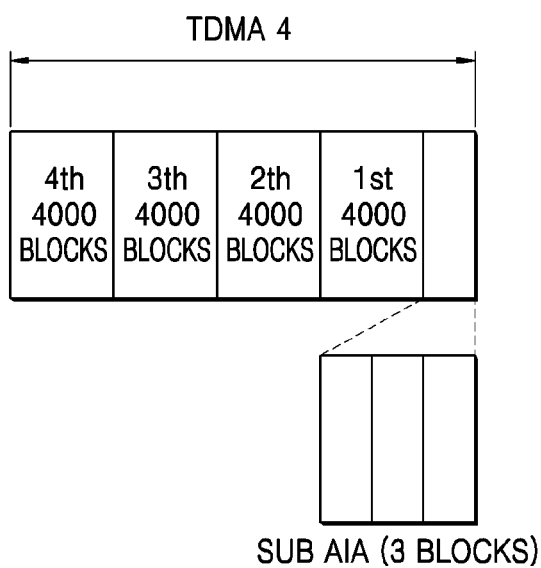

FIGS. 9A and 9B illustrate sub AIAs according to another embodiment of the present invention. A write-once disc according to the present embodiment is a disc in which a TDMA3, a TDMA4, and a TDMA5 are allocated to a data area when initialization to use the disc is performed as shown in FIGS. 3A and 3B. Therefore, as described above, since 5 TDMAs are allocated, the main AIA includes 4 recording unit blocks. In the present embodiment, each of the TDMA3 and the TDMA4 includes 16,000 blocks, and the TDMA5 includes 35,000 blocks as shown in FIG. 8.

FIG. 9A illustrates a data structure of the TDMA3, and FIG. 9B illustrates a data structure of the TDMA4. The TDMA3 includes 4 sub areas. Therefore, a sub AIA included in the TDMA3 includes 3 recording unit blocks. Since the TDMA4 is the same as the TDMA3, a sub AIA included in the TDMA4 also includes 3 recording unit blocks.

The TDMA5 is divided into units of 4,000 recording unit blocks (except for the one unit that contains only 3,000 recording unit blocks), and includes 9 sub areas. Therefore, as described above, a sub AIA included in the TDMA5 includes 8 recording unit blocks.

As described above, according to the first embodiment, a recording and/or reproducing apparatus can more quickly access a location where a final TDDS is recorded by recording main AI in a main AIA, and sub AI in a sub AIA.

An operation in which a recording and/or reproducing apparatus accesses a location where the final TDDS is recorded from the main AI and the sub AI will now be described in more detail.

According to the first embodiment, when a write-once disc in which main AI and sub AI are recorded is loaded in a recording and/or reproducing apparatus, the recording and/or reproducing apparatus accesses a main AIA. If information is not recorded in the main AIA at all, the recording and/or reproducing apparatus determines that a final TDDS is recorded in a TDMA1, or the write-once disc is a blank disc, and accesses the TDMA1. If no data is recorded in the TDMA1, the recording and/or reproducing apparatus recognizes that the write-once disc is a blank disc and starts initialization for using the write-once disc. If data is recorded in the TDMA1, the recording and/or reproducing apparatus obtains the final TDDS from the TDMA1.

If data is recorded in the main AIA, the recording and/or reproducing apparatus reproduces a TDDS by accessing a block in which the data is finally recorded. The recording and/or reproducing apparatus recognizes which block is the block in which the data is finally recorded, and recognizes in which TDMA the final TDDS is recorded. Also, the recording and/or reproducing apparatus can recognize the size of a TDMA in which the final TDDS is recorded from the reproduced TDDS, and recognize whether a sub AIA is allocated to the TDMA from the size information. And, if the sub AIA is allocated to the TDMA, the recording and/or reproducing apparatus can recognize the size of the sub AIA. If the sub AIA is not allocated to the TDMA in which the final TDDS is recorded, the recording and/or reproducing apparatus searches for the final TDDS from the TDMA.

However, if the sub AIA is allocated to the TDMA in which the final TDDS is recorded, the recording and/or reproducing apparatus accesses the sub AIA, recognizes up to which block data is recorded, and recognizes in which sub area of the TDMA in which the final TDDS is recorded, the final TDDS is recorded.

II. The Second Embodiment

Unlike the first embodiment, in the second embodiment, sub AIAs are not allocated, and at least one AIA used to record AI is allocated to a lead-in area or an inner area of a write-once disc.

Figure 10:
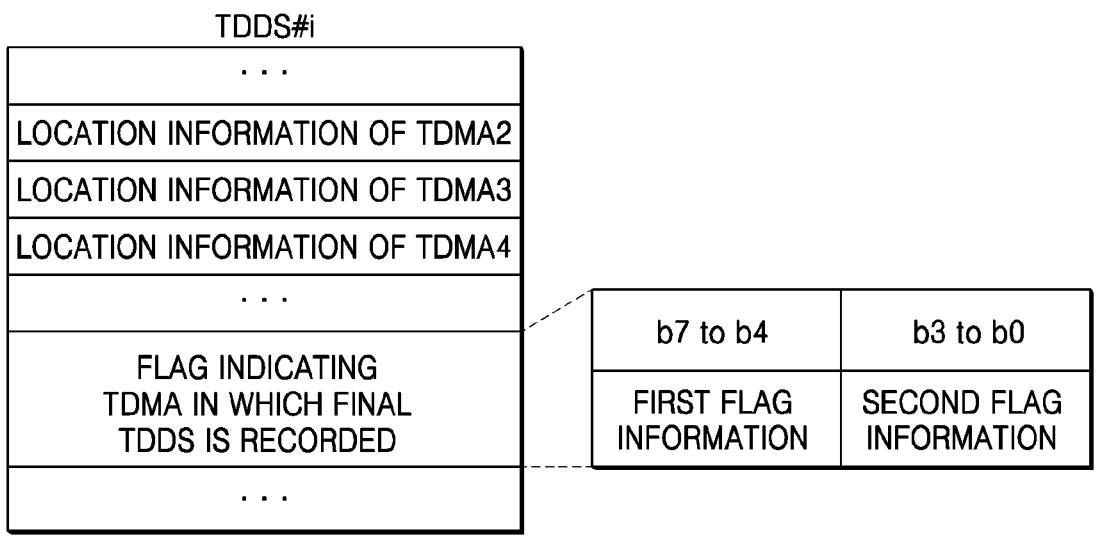
FIG. 10 is a data structure of access information according to an embodiment of the present invention.

FIG. 10 is a data structure of access information (AI) according to an embodiment of the present invention. The data structure of the AI shown in FIG. 10 is substantially identical to a data structure of a TDDS. However, a flag indicating a TDMA in which a final TDDS is recorded is further included in the TDDS.

In the present embodiment, the flag includes first flag information indicating the TDMA in which the final TDDS is recorded, and second flag information indicating which part of the TDMA indicated by the first flag information the final TDDS is recorded in.

The first flag information is comprised of 4 bits, b4 through b7. For example, it can be defined that the final TDDS is recorded in a TDMA1 when b4 through b7 are "0000b", a TDMA2 when b4 through b7 are "0001 b", a TDMA3 when b4 through b7 are "0010b", a TDMA4 when b4 through b7 are "0100b", and a TDMA5 when b4 through b7 are "1000b".

The second flag information is comprised of 4 bits, b0 through b3. The second flag information in a case where the first flag information indicates the TDMA5, which is divided into 5 sub areas, will now be described as an example. It can be defined that the final TDDS is recorded in a first sub area when b0 through b3 are "0000b", a second sub area when b0 through b3 are "0001 b", a third sub area when b0 through b3 are "0010b", a fourth sub area when b0 through b3 are "0100b", and a fifth sub area when b0 trough b4 are "1000b".

When the TDDS used as the AI is recorded, in order to increase a possibility of successfully reproducing the TDDS, it is preferable, though not necessary, that the TDDS is repeatedly recorded in one recording block.

III. The Third Embodiment

The present embodiment is similar to the first embodiment described above. However, unlike the first embodiment, in the present embodiment, sub AI is not recorded in a write-once disc. Therefore, in the present embodiment, a sub AIA is not allocated to a TDMA, and the main AI and the main AIA in the first embodiment are represented as AI and an AIA, respectively.

A recording and/or reproducing apparatus in which the write-once disc according to the present embodiment is loaded records user data in a data area and a TDDS in one of a plurality of TDMAs. If a newly updated TDDS cannot be recorded in a TDMA in which a previous TDDS is recorded, due to the TDMA being full, the newly updated TDDS is recorded in one of the plurality of TDMAs based on a using order. Also, the newly updated TDDS is recorded in one recording block of the AIA as the AI.

A reproducing apparatus in which the write-once disc according to the present embodiment is loaded accesses the AIA and determines a final TDMA, in which a finally updated TDDS is recorded, among the plurality of TDMAs on the basis of the number of recording blocks in which the AI is recorded. Then, the reproducing apparatus obtains the finally updated AI from a recording block, which is finally recorded in the final TDMA. The reproducing apparatus obtains location information of the final TDMA, in which the finally updated TDDS is recorded, from the finally updated AI. Finally, the reproducing apparatus obtains the finally updated TDDS from the final TDMA. Since a TDDS, which is recorded as the AI in the AIA, is recorded in the AIA only in a case such that a TDMA in which an updated TDDS is recorded is changed, the TDDS may be different from the finally updated TDDS.

In the embodiments described above, when a TDDS used as the AI is recorded, it is preferable, though not necessary, that the TDDS be repeatedly recorded in one recording block. If the size of the TDDS is equal to the size of one sector, 2K bytes, and if the size of the recording unit block is 64K bytes, one TDDS can be repeatedly recorded 32 times in one recording block. An error correction format that enables error correction in sector units is disclosed in U.S. Pat. No. 6,367,049. If one TDDS is repeatedly recorded 32 times in one recording unit block of a 64K byte size according to the error correction format disclosed in U.S. Pat. No. 6,367,049, a possibility of successfully reproducing the TDDS can be highly increased.

Figure 11:
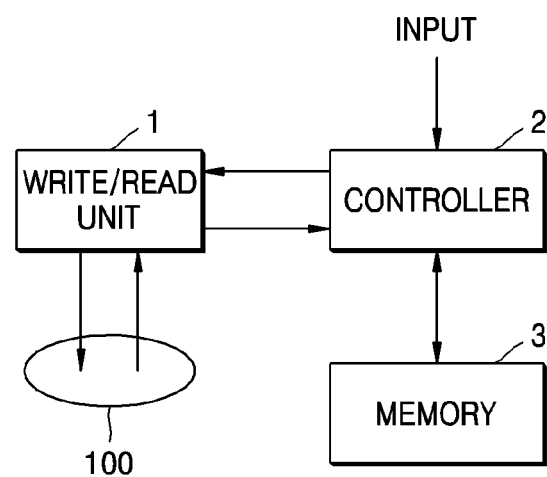
FIG. 11 is a block diagram of a data recording and/or reproducing apparatus according to an embodiment of the present invention.

FIG. 11 is a block diagram of a data recording and/or reproducing apparatus according to an embodiment of the present invention. Referring to FIG. 11, the data recording and/or reproducing apparatus includes a write/read unit 1, a controller 2, and a memory 3. Under the control of the controller 2, the write/read unit 1 writes data on a write-once disc 100 and reads the data recorded on the write-once disc 100. The write-once disc 100 is a write-once disc according to the first or second embodiment.

The controller 2 controls the write/read unit 1 to write main AI, sub AI, or AI according to the present invention on the write-once disc 100.

The controller 2 error-correction-encodes a TDDS used as the main AI, the sub AI, or the AI according to an error correction format that enables error correction in sector units and controls the write/read unit 1 to repeatedly record the error-correction-encoded TDDS in a recording unit block. An error correction format that enables error correction in sector units is disclosed in U.S. Pat. No. 6,367,049. If the size of the TDDS is equal to the size of one sector, 2K bytes, and if the size of the recording unit block is 64K bytes, one TDDS can be repeatedly recorded 32 times in one recording block.

The operations of the recording and reproducing apparatus and the reproducing apparatus from the descriptions of the first and second embodiments described above will be easily understood by those skilled in the art.

As described above, according to embodiments of the present invention, an access time for reading a predetermined kind of information required to use a write-once disc can be reduced. In particular, when a plurality of update areas for writing updated information required to use the write-once disc exist, a recording apparatus or a reproducing apparatus can quickly and easily determine an update area in which finally updated information is recorded among the plurality of update areas. Furthermore, when access information is recorded, the access information is error-correction-encoded according to a predetermined error correction format, and the error-correction-encoded access information is repeatedly recorded in one recording unit block. Accordingly, even if defects due to scratches are generated on the recording unit block in which the access information is repeatedly recorded, a possibility of successfully reproducing access information can be highly increased.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A write-once disc for a disc reproducing apparatus, the write-once disc comprising:
   a plurality of temporary disc management areas in which a temporary disc management structure is stored, the temporary disc management structure comprising:
      a temporary defect list comprising a first pointer pointing to a location of a defective area, and a second pointer pointing to a location of a replacement area replacing the defective area;
      a temporary disc definition structure comprising location information of the temporary defect list; and
      a space bit map representing a data recording status of the write-once disc with a bit map by allocating different bit values to clusters of the write-once disc in which data is recorded, and clusters of the write-once disc in which data is not recorded; and
   an access information area comprising a plurality of unit blocks corresponding to the plurality of temporary disc management areas, the access information area indicating one of the plurality of temporary disc management areas in which a finally updated temporary disc management structure is stored based on the unit block corresponding to the temporary disc management area in which the finally updated temporary disc definition structure is stored, and the write-once disc comprises N number of temporary disc management areas and a number of unit blocks for the temporary disc management areas in the access information area is N−1;
   wherein the temporary disc definition structure further comprises address information that allows the disc reproducing apparatus to find a location of the temporary disc management area in which the finally updated temporary disc definition structure is stored, and location information of the space bit map; and
   the finally updated temporary disc management structure is recorded in a defect management area provided in a lead-in area of the write-once disc when the write-once disc is finalized.

2. The write-once disc of claim 1, wherein the temporary disc definition structure further comprises location information and size information of spare areas allocated in a data area of the write-once disc, and location information and size information of ones of the temporary disc management areas that are allocated in the data area.

3. A recording apparatus for recording data on an information storage medium, the information storage medium comprising a plurality of temporary disc management areas and an access information area, the access information area comprising a plurality of unit blocks corresponding to the plurality of the temporary disc management areas, the recording apparatus comprising:
   a recording unit configured to record the data on the information storage medium; and
   a controller configured to control the recording unit to:
      record an updated temporary disc management structure in at least one of the plurality of temporary disc management areas; and
      record a temporary disc definition structure in at least one of the plurality of unit blocks of the access information area corresponding to the plurality of the temporary disc management areas when the updated temporary disc management structure is recorded in the at least one temporary disc management area corresponding to the at least one unit block;
   wherein the access information area indicates one of the plurality of temporary disc management areas in which a finally updated temporary disc management structure is recorded based on one of the plurality of unit blocks of the access information area corresponding to the temporary disc management area in which the finally updated temporary disc definition structure is recorded, and the write-once disc comprises N number of temporary disc management areas and a number of unit blocks for the temporary disc management areas in the access information area is N−1;
   the temporary disc definition structure comprises address information that allows the recording apparatus to find a location of the temporary disc management area in which the finally updated temporary disc management structure is recorded, and location information of a space bit map;
   the temporary disc management structure comprises:
      the temporary disc definition structure;
      a temporary defect list comprising a first pointer pointing to a location of a defective area, and a second pointer pointing to a location of a replacement area replacing the defective area; and
      the space bit map, the space bit map representing a data recording status of the information storage medium with a bit map by allocating different bit values to clusters of the information storage medium in which data is recorded, and clusters of the information storage medium in which data is not recorded; and
   the temporary disc definition structure further comprises location information of the temporary defect list.

4. The recording apparatus of claim 3, wherein the temporary disc definition structure further comprises location information and size information of spare areas allocated in a data area of the information storage medium, and location information and size information of ones of the temporary disc management areas that are allocated in the data area.

5. A reproducing apparatus for reproducing data from an information storage medium, the information storage medium comprising a plurality of temporary disc management areas and an access information area, the access information area comprising a plurality of unit blocks corresponding to the plurality of the temporary disc management areas, the reproducing apparatus comprising:
   a reproducing unit configured to reproduce a temporary disc management structure stored in at least one of the plurality of temporary disc management areas, the temporary disc management structure comprising:
      a temporary defect list comprising a first pointer pointing to a location of a defective area, and a second pointer pointing to a location of a replacement area replacing the defective area a temporary disc definition structure comprising location information of the temporary defect list; and a space bit map representing a data recording status of the information storage medium with a bit map by allocating different bit values to clusters of the information storage medium in which data is recorded, and clusters of the information storage medium in which data is not recorded; and a controller configured to:

determine one of the plurality of temporary disc management areas in which a finally updated temporary disc management structure is stored based on one of the plurality of unit blocks of the access information area corresponding to the temporary disc management area in which the finally updated temporary disc definition structure is stored, wherein the information storage medium comprises N number of temporary disc management areas and a number of unit blocks for the temporary disc management areas in the access information area is N−1; and control the reproducing unit to reproduce the finally updated temporary disc management structure from the temporary disc management area in which the finally updated temporary disc definition structure is stored;

wherein the temporary disc definition structure further comprises address information that allows the reproducing apparatus to find a location of the temporary disc management area in which the finally updated temporary disc management structure is recorded, and location information of the space bit map.

6. The reproducing apparatus of claim 5, wherein the temporary disc definition structure further comprises location information and size information of spare areas allocated in a data area of the information storage medium, and location information and size information of one of the temporary disc management areas that are allocated in the data area.

* * * * *